(12) United States Patent  
Weaver

(10) Patent No.: US 8,427,730 B1  
(45) Date of Patent: Apr. 23, 2013

(54) 3D PROJECTION LENS

(76) Inventor: Raymond G. Weaver, Cornville, AZ (US)

(*) Notice: Subject to any disclaimer, the term of this patent is extended or adjusted under 35 U.S.C. 154(b) by 52 days.

(21) Appl. No.: 13/065,405

(22) Filed: Mar. 22, 2011

(51) Int. Cl.
*G02B 26/02* (2006.01)
*G02B 5/30* (2006.01)

(52) U.S. Cl.
USPC .......... 359/233; 359/487.03; 359/487.05; 359/489.07; 352/57

(58) Field of Classification Search .......... 359/227, 359/233, 464, 465, 487.01, 487.02, 487.05, 359/487.03, 489.07; 352/57, 60
See application file for complete search history.

(56) References Cited

U.S. PATENT DOCUMENTS

| | | | | |
|---|---|---|---|---|
| 4,128,302 A | * | 12/1978 | Di Vita | 385/33 |
| 4,235,503 A | | 11/1980 | Condon | |
| 4,472,037 A | * | 9/1984 | Lipton | 352/57 |
| 5,481,321 A | * | 1/1996 | Lipton | 352/57 |

* cited by examiner

*Primary Examiner* — Ricky D Shafer
(74) *Attorney, Agent, or Firm* — Kenneth W. Float

(57) ABSTRACT

Disclosed are optical projection lenses for projecting three dimensional images. Exemplary lenses comprise a chassis, first and second sets of offset truncated optical elements and first and second polarizers respectively disposed in light paths of the first and second sets of optical elements. An optional hot mirror may be disposed between the polarizers and the sets of optical elements. Preferably, an aperture plate is disposed at an output end of the chassis. The aperture plate may comprise upper and lower adjustable masking strips that are adjustable up and down to allow masking of an image for a particular throw. The lenses comprise focus adjustment apparatus for adjusting the relative focus of the sets of optical elements, and convergence adjustment apparatus for adjusting the convergence of the sets of optical elements.

10 Claims, 8 Drawing Sheets

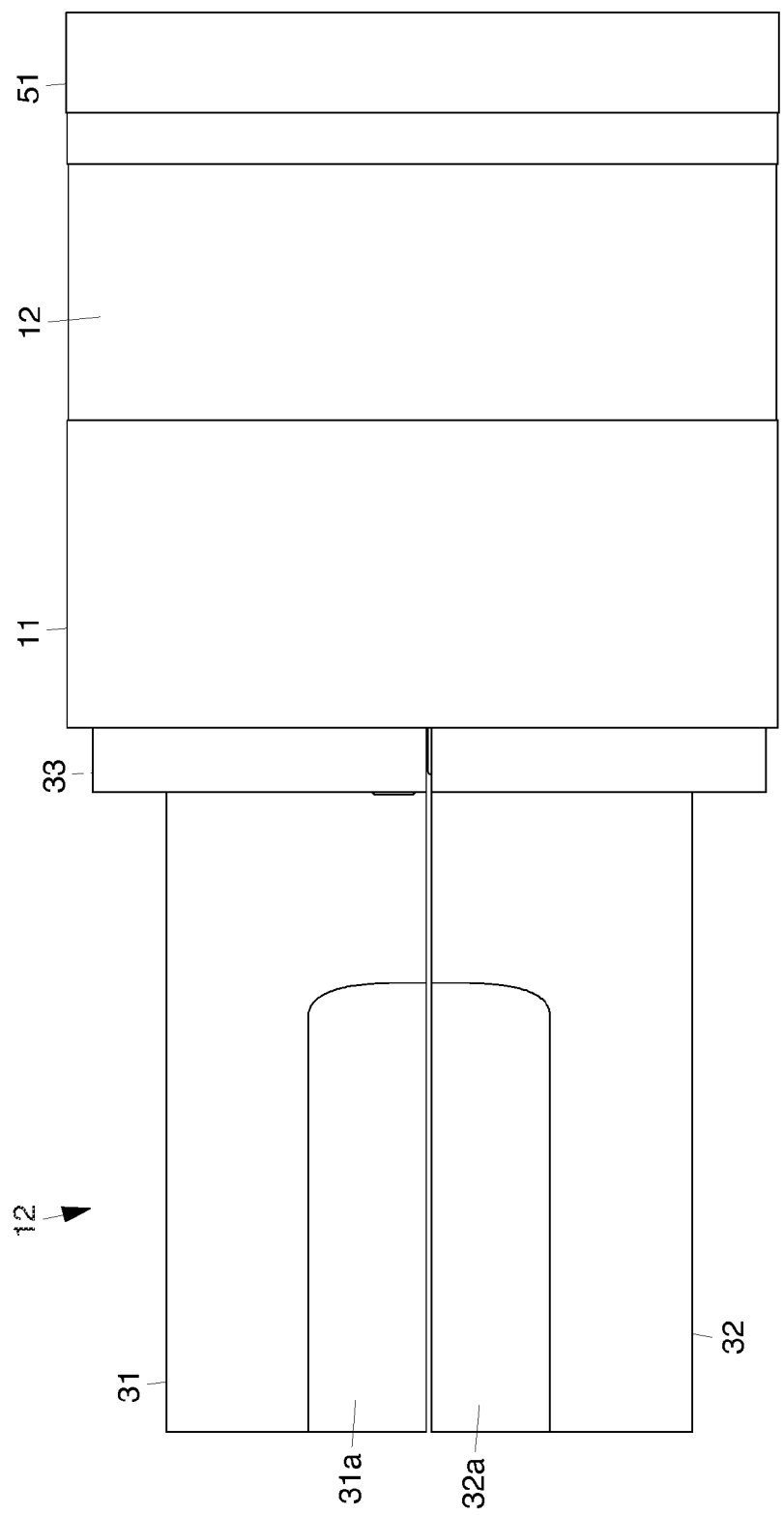

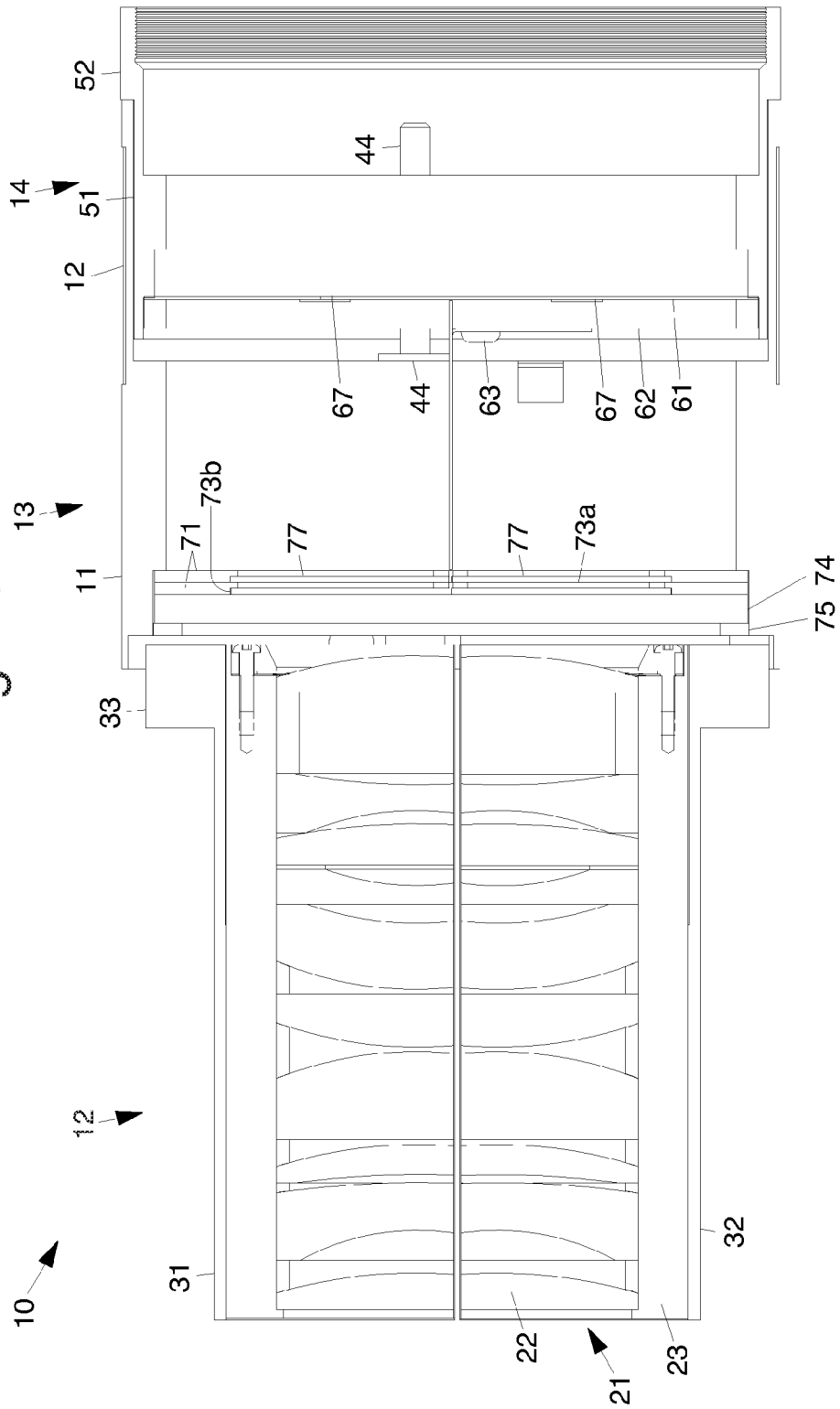

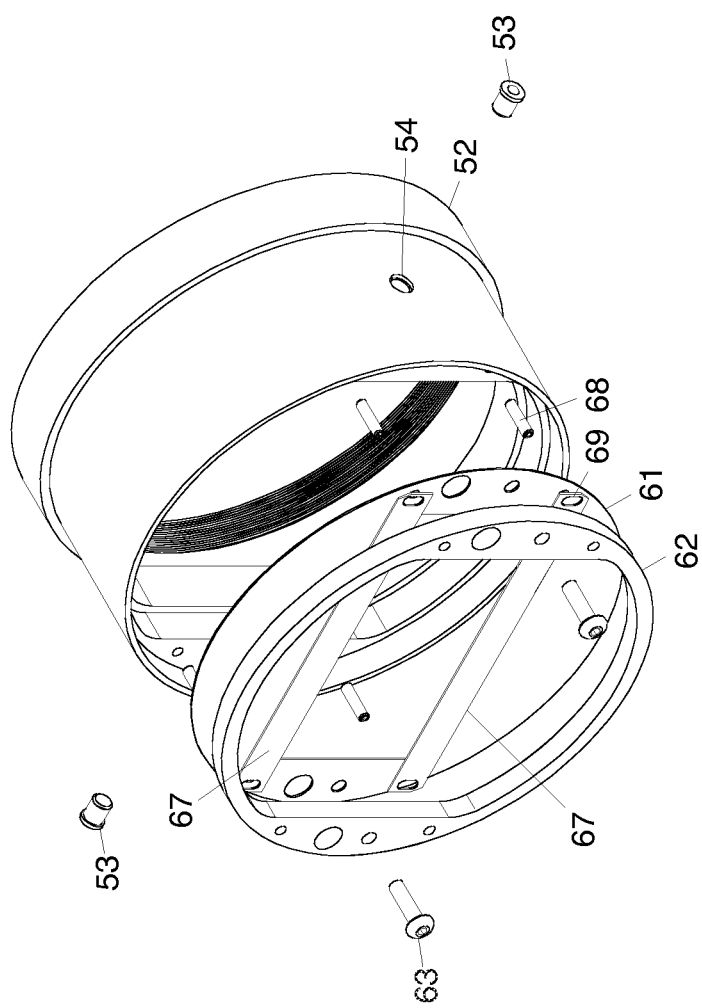

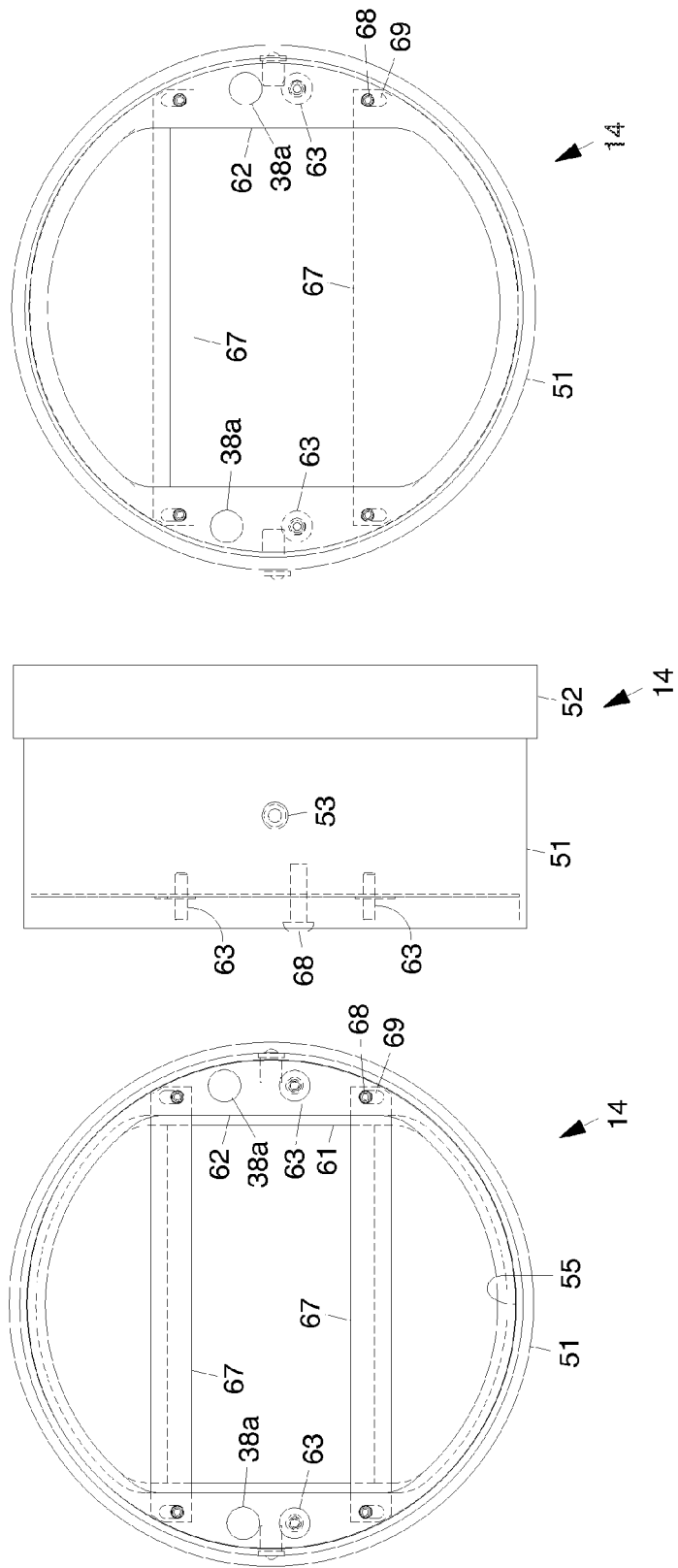

3D PROJECTION LENS

BACKGROUND

The present invention relates generally to optical projection lenses, and more particularly, to optical projection lenses for use in projecting three dimensional images.

Movies have been recorded on film in three-dimensional formats for 100 years or more major cinema releases occurred in the 1950's using dual strips and dual projectors and a dual lens side-by side anamorphic formats. In the 1980 era a top-bottom format became popular. The industry standard for this format is SMPTE 257. The ultimate goal for 3D projection has always been to provide the same amount of light to the eye in 3D that is provided with a standard 2D presentation. The present invention resolves this issue. Existing 3D film projection lenses are limited to screen widths of 40 feet. It would be desirable to have a lens that can project images wider than 40 feet.

With the current acceptance of digital 3d presentations as a viable medium for cinema and other venues, and the lower than expected roll out of digital systems to the exhibition community a 3D film solution is appropriate to fill this gap on a world wide basis.

3D film projection lenses utilizing a top/bottom truncated design have always had reliability issues in regards to the failure of polarizers due to heat related issues. U.S. Pat. No. 4,235,503 issued to Condon attempted to resolve this issue by using an ultra violet light filter and mechanical heat sink. A current version has added truncated anti-reflection plates to the input side of the truncated optics with limited success. This has resulted in additional problem in that with this added hardware, the lens back focus and radial clearance dimensions do not allow it to be used on a significant number of projector types and models.

The two lens sets are converged using adjustments at the rear of the lens in a vertical movement. When installed into a projector this is a difficult task and requires removal and reinstallation to optimize. There is a small adjustment range for setting the back focus of both lens sets, but not sufficient to handle significant keystone issues in theatres with balconies.

A projector aperture plate is cut for the film format height. If the aperture plate is not cut perfect, or the projector moves, spill will occur and the window port of the booth will have to be masked by hand.

There is no known split-lens 3D projection lens design that uses wire grid polarizers that can withstand the heat produced by high-power projectors. There is no known split-lens 3D projection lens design that provides for rotational convergence of the image projected by the lens. There is no known split-lens 3D projection lens design that optionally employs a hot mirror located after the lenses to help reduce heat on polarizers. There is no known split-lens 3D projection lens design that provides for independent focus adjustment of the right eye image with sufficient range to compensate for keystone issues. There is no known split-lens 3D projection lens design that integrates an adjustable aperture plate into the lens to resolve light spillover that typically occurs above and below the image on the screen and which requires a projectionist to manually mask the port window of the projection booth.

It would be desirable to have an improved optical projection lens for use in projecting three-dimensional images. It would also be desirable to have an optical projection lens that overcomes the limitations of projection lenses that use conventional film polarizer material. It would also be desirable to have an optical projection lens that allows for rotational convergence of the projected image. It would also be desirable to have an optical projection lens that optionally employs a hot mirror located after the lenses to help reduce heat on polarizers. It would also be desirable to have an optical projection lens that employs a quarter wave plate for use in projecting circularly polarized light images. It would also be desirable to have an optical projection lens that provides for independent focus adjustment of the right eye image to compensate for keystone problems. It would also be desirable to have an optical projection lens that integrates an aperture plate into the lens to resolve light spillover that typically occurs above and below the image on the screen.

BRIEF DESCRIPTION OF THE DRAWINGS

The various features and advantages of the present invention may be more readily understood with reference to the following detailed description taken in conjunction with the accompanying drawing figures, wherein like reference numerals designate like structural element, and in which:

FIG. 2a illustrates a side view of the exemplary optical projection lens;

FIG. 2c illustrates a cross-sectional view of the exemplary optical projection lens taken along the lines 2c-2c in FIG. 2b;

FIG. 4a illustrates an enlarged exploded view of an exemplary aperture section of the exemplary optical projection lens; and FIGS. 4b-4d illustrate side, input end and output end views, respectively, of the exemplary aperture section shown in FIG. 4a.

DETAILED DESCRIPTION

Figure 1:
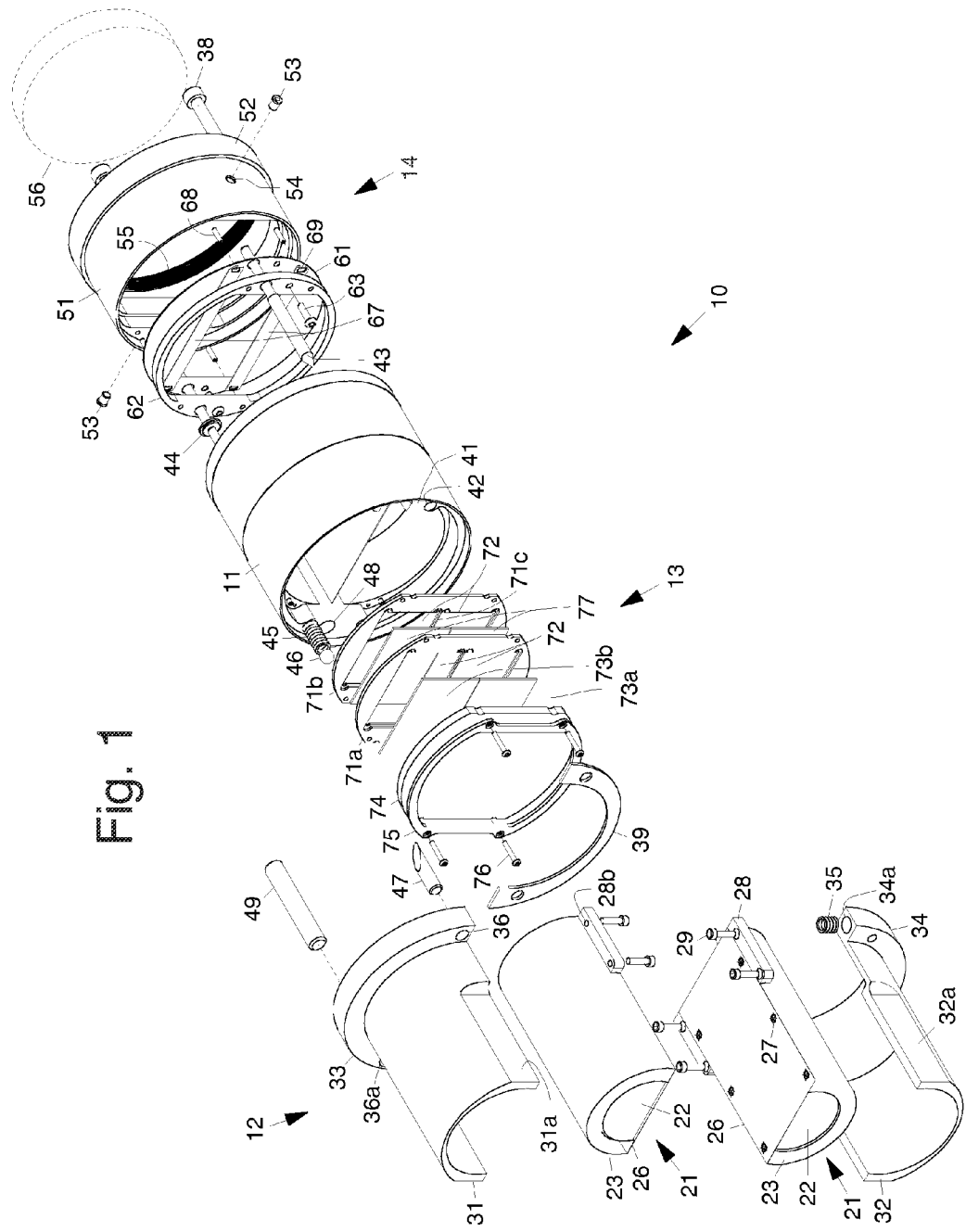
FIG. 1 illustrates an exploded view of an exemplary optical projection lens for use in projecting three-dimensional images.
Figure 2B:
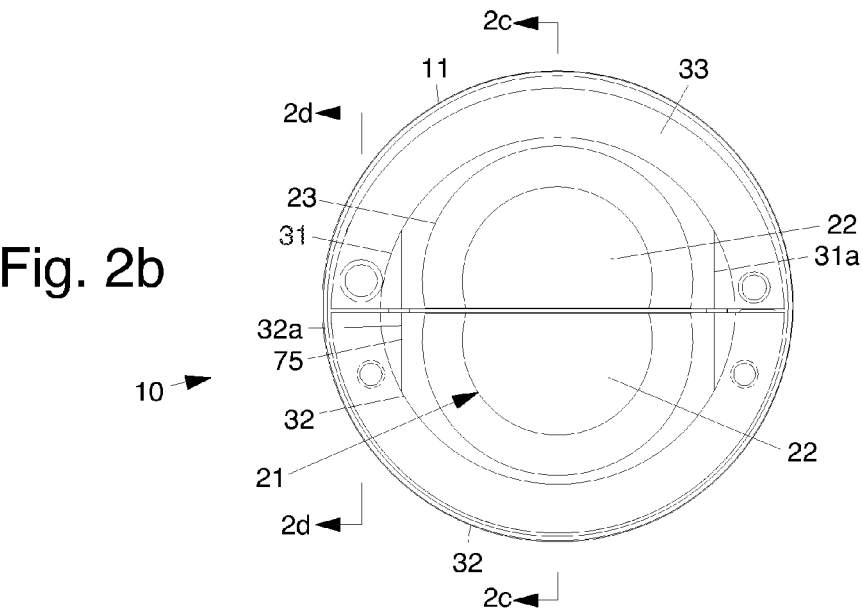
FIG. 2b illustrates an input end view of the exemplary optical projection lens.
Figure 2D:
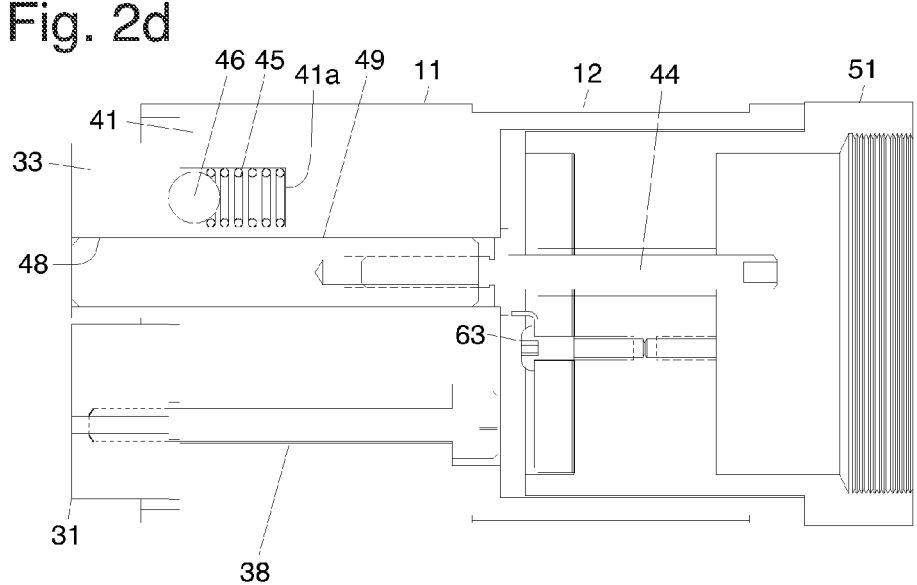
FIG. 2d illustrates a cross-sectional view of the exemplary optical projection lens taken along the lines 2d-2d in FIG. 2b.
Figure 3A:
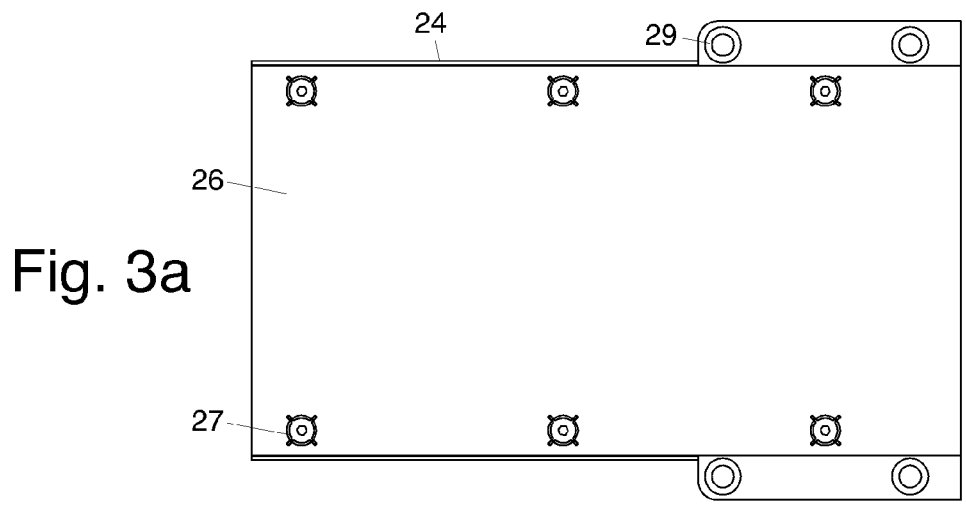
FIGS. 3a-3d illustrate bottom, side, input end and output end views, respectively, of an exemplary optics section that may be employed in the exemplary optical projection lens.
Figure 3B:
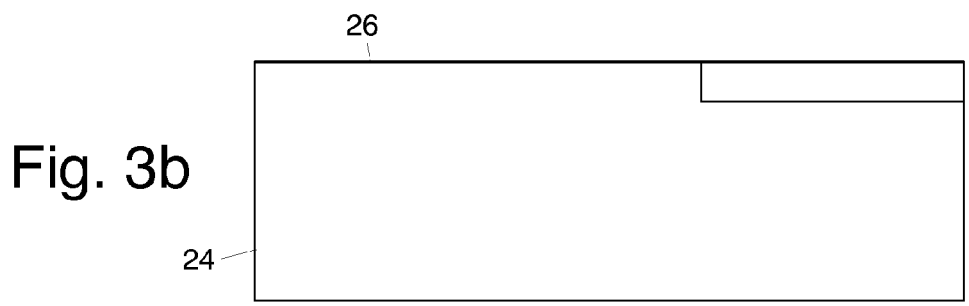
Figure 3C:
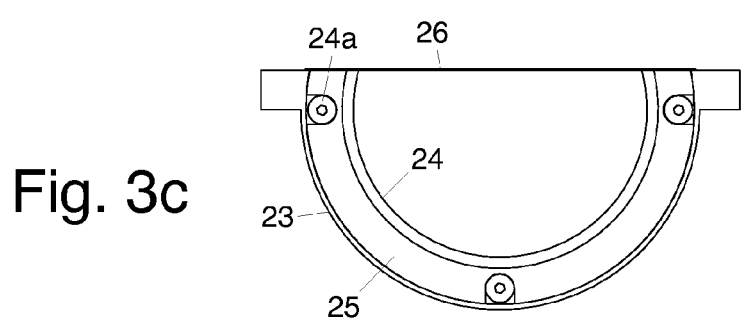
Figure 3D:
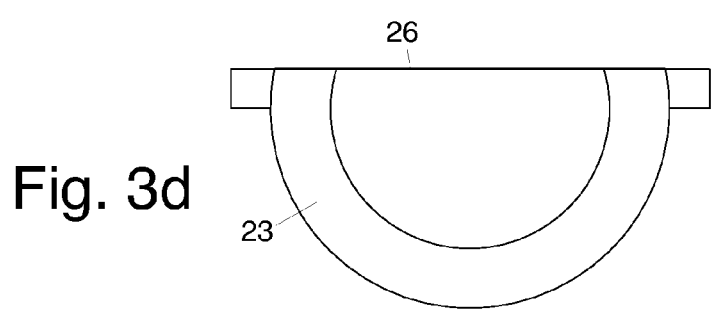
Figure 3E:
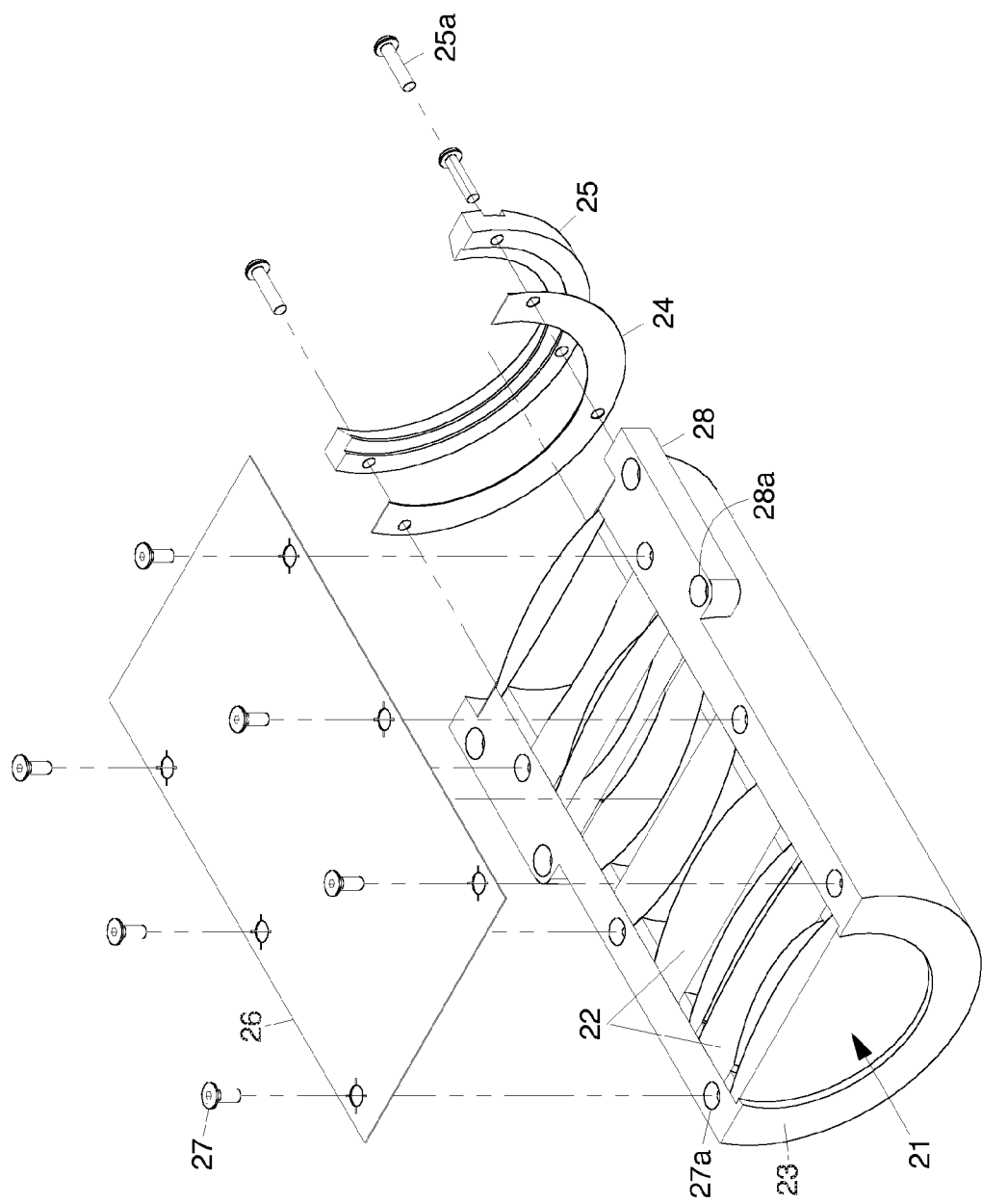
FIG. 3e illustrates an enlarged exploded view of one half of an exemplary optics section that may be employed in the exemplary optical projection lens.

Referring to the drawing figures, disclosed is an optical projection lens 10 for use in projecting three dimensional (3D) images, particularly onto a movie screen. More specifically, FIG. 1 illustrates an exploded view of the exemplary optical projection lens 10. FIG. 2a illustrates a side view of the exemplary optical projection lens. FIG. 2b illustrates an input end view of the exemplary optical projection lens 10. FIG. 2c illustrates a cross-sectional view of the exemplary optical projection lens 10 taken along the lines 2c-2c in FIG. 2b. FIG. 2d illustrates a cross-sectional view of the exemplary optical projection lens 10 taken along the lines 2d-2d in FIG. 2b. FIGS. 3a-3d illustrate bottom, side, input end and output end views, respectively, of an exemplary optics section that may be employed in the exemplary optical projection lens 10. FIG. 3e illustrates an enlarged exploded view of one half of an exemplary optics section that may be employed in the exemplary optical projection lens 10. FIG. 4a illustrates an enlarged exploded view of an exemplary aperture section of the exemplary optical projection lens 10. FIGS. 4b-4d illustrate side, input end and output end views, respectively, of the exemplary aperture section shown in FIG. 4a.

The optical projection lens 10 comprises several main components and/or subassemblies or sections including a main chassis 11 (FIGS. 1, 2c, 2d), an optics section 12, or optics module 12, (FIGS. 1, 2a and 2c), a polarizer/mirror section 13 (FIGS. 1, 2c), and an aperture section 14 (FIGS. 1, 2c, 4a-4d).

Referring to FIG. 1, the 3D optical projection lens 10 has a split-lens design, wherein the optics section 12 comprises two truncated sets 21 of optical elements 22 that are assembled in upper and lower truncated optics tubes 23 such that centerlines of the respective sets 21 of optical elements 22 are offset from each other to conform to SMPTE 257 film format. The respective sets 21 of optical elements 22 are matched in F-number and focal length. Ten different focal length lenses 10 have been designed at the present time. Typical focal lengths include 30 mm, 35 mm, 37.5 mm, 40 mm, 42.5 mm, 45 mm, 47.5 mm, 50 mm, 55 mm and 60 mm, for example.

As is shown in FIGS. 1, 2a, 2b, 2c, and 3a-3e, the respective sets 21 of optical elements 22 are retained in the upper and lower truncated optics tubes 23 by upper and lower covers 26 using a plurality of retaining screws 27, such as flat head Torx screws, for example. The plurality of retaining screws 27 mate with threaded openings 27a in the optics tubes 23 to secure the sets 21 of optical elements 22 in the optics tubes 23.

Upper and lower lens retainers 24, 25 (FIGS. 3b, 3c, 3e) retain the respective sets 21 of optical elements 22 in an axial direction at the output end of the upper and lower truncated optics tubes 23 using a plurality of retaining screws 24a. The upper and lower optics tubes 23 have longitudinal wings 28 with openings 28a therein that receive screws 29 that mate with threaded openings 28b in lens housings 31, 32 to secure the truncated optics tubes 23 to the lens housings 31, 32.

The upper and lower truncated optics tubes 23 with their sets 21 of optical elements 22 retained by the upper and lower covers 26 and upper and lower lens retainers 24, 25 are disposed in and captivated by the upper and lower lens housings 31, 32. The upper and lower lens housings 31, 32 have upper and lower circular flanges 33, 34. The lower circular flange 34, for example, has an opening 34a for receiving a spring 35 that is used to control convergence. A lower housing shim 39 is disposed between the lower lens housing 32 and the chassis 11 that is used to offset the focal plane of the lower set 21 of optical elements 22 from the focal plane of the upper set 21 of optical elements 22.

As is shown in FIGS. 1, 2c, and 2d, the 3D optical projection lens 10 preferably comprises a tubular chassis 11. The tubular chassis 11 may have a label 12 secured to its periphery. The tubular chassis 11 has diametrically opposed thickened input end portions 41. The thickened input end portions 41 have first and second openings 42, 48 formed therein. One of the thickened front end portions 41 has an opening 41a formed therein that receives a spring 45 and ball 46. A focus pin 49 is pressed into a hole 36a in the end of the circular flange 33 of the upper lens housing 31. A focus adjustment screw 44 accessible from the output end of the lens 10 is threaded into the focus pin 49. The spring 45 and ball 46 exert force on the upper lens housing 31. Rotation of the focus adjustment screw 44 moves the upper lens housing 31 and set of optical elements 22 axially along the optical axis of the lens 10 to allow focus adjustment of one set of optical elements 22 relative to the other.

As is shown more clearly in FIG. 2d, the focus pin 49 is pressed into a hole 33a in the upper housing 31 and extends out of the upper housing 31 about one inch. The focus pin 49 slides through the hole 48 in the thickened input end portion 41 of the chassis 11. The focus adjustment screw 44 threads into a threaded hole in the focus pin 49. A compression spring 45 and ball 46 are disposed in a counter bore in the thickened input end portion 41 adjacent to the hole 48. The ball 46 presses against the output surface of the upper lens housing 31 when the lens 10 is assembled to preload the upper housing 31. Rotation of the focus adjustment screw 44 causes axial movement of the upper housing 31 relative to the chassis to provide for focus adjustment of the set 21 of optical elements 22 attached to the upper housing 31.

As is shown in FIG. 1, a convergence adjustment pin 47 having a sloped surface is pressed into a hole 36 in the upper circular flange 33 of the upper lens housing 32. A convergence adjustment screw 43 is disposed through a threaded hole 42 in the thickened input end portion 41 of the chassis 11. The convergence adjustment screw 43 contacts the sloped surface of the convergence adjustment pin 47 and contacts the upper lens housing 31 when the lens 10 is assembled. A spring 35 is disposed in a hole 34a in the lower lens housing 32 and contacts the upper lens housing 31 when the lens 10 is assembled. Rotation of the convergence adjustment screw 43 causes it to ride along the sloped surface of the convergence adjustment pin 47 moving the upper lens housing 31 relative to the lower lens housing 32, thus controlling lens convergence.

As is shown in FIGS. 1 and 2c, the polarizer/mirror section 13 is disposed at an input end of the chassis 11 between the optics section 12 and the chassis 11. A polarizer holder 71a and a quarter wave plate holder 71b are disposed at the front (input) end of the chassis 11. The polarizer and quarter wave plate holders 71a, 71b each have a septum to 71c that assist in isolation of the two images and also act as an aperture. Each holder 71a, 71b has first and second vertically offset rectangular openings 72 formed therein. First and second (left eye, right eye) wire grid polarizers 73a, 73b are disposed in the polarizer holder 71a. The quarter wave plate holder 71b optionally houses first and second glass quarter wave plates 77. The glass quarter wave plates 77 cause reflections from the polarizers to be rotated and thus negated. In a linear version the quarter wave plates are replaced with glass ports.

The first and second wire-grid polarizers 73a, 73b and the first and second quarter wave plates 77 are respectively disposed in light paths of the first and second sets of offset truncated optical elements 22. An optional hot mirror 74 may be disposed in front of the polarizer holder 71. The hot mirror 74 is a dielectric mirror, or a dichroic filter, that reflects infrared light back toward a light source (i.e., projector), while allowing visible light to pass. The polarizer holder 71 housing the polarizers 73a, 73b, the quarter wave plate holder 71b optionally housing the quarter wave plates 77, and the hot mirror 74, are secured to the chassis 11 using a retainer 75 and four retaining screws 76, such as button head Torx screws, for example. The lower housing shim 39 is disposed between the lower lens housing 32 and the retainer 75 and is secured by the lower two retaining screws 76.

The use of the wire grid polarizers 73a, 73b results in a superior projection lens 10. Prior art problems relating to heating of conventional polarizers is eliminated by the use of the wire grid polarizers 73a, 73b. The wire grid polarizers 73a, 73b can handle a large amount of heat input supplied by projectors without degradation. Thus, the wire grid polarizers 73a, 73b allow use of higher power projectors. In addition, the use of the hot mirror 74 in front of the wire grid polarizers 73a, 73b reflects infrared light back toward the projector. This lessens the power input to the wire grid polarizers 73a, 73b.

The aperture section 14 is illustrated in FIGS. 1, 2c, and 4a-4d. The aperture section 14 comprises a tubular aperture housing 51 that slides into a rear end of the chassis 11. The aperture housing 51 has a stepped diametrical cross section, with its rear portion having a shoulder 52 that abuts the rear end of the chassis 11 when assembled. The aperture housing 51 has a diameter that is designed to slide into the rear portion of the chassis 11 until the rear end of the chassis meets the shoulder 52. The aperture housing 51 includes first and second spring detents 53 that protrude through respective openings 54 in the aperture housing 51. The detents are used to retain the aperture housing and to properly radially orient the moveable apertures.

An aperture plate 61 is disposed adjacent a front end of an aperture housing 51 and is secured to the polarizer housing 51 by an aperture retainer 62 using retaining screws 63, such as socket head Torx screws, for example. Two masking strips 67 are adjustably attached to respective upper and lower edges of the aperture plate 61. The masking strips 67 are adjustable up and down using roll pins 68 as guides that move within slots 69. This allows a projectionist to mask the image for a particular variation in the throw of the image. This eliminates the need for a projectionist to mask the port windows with tape to eliminate the over and under spill of the images.

Four roll pins 64 are inserted through respective openings 65 in the aperture retainer 62, the aperture plate 61, and the polarizer housing 51 to properly align the aperture plate 61. The convergence adjustment screw 16 and the focus adjustment screw 17 protrude through respective openings 66, 67 in the aperture retainer 62 and aperture plate 61 and are received by the first and second threaded openings 42 formed in the front end portions 41 of the aperture housing 51. The convergence and focus adjustment screws 43, 44 are accessible and adjustable from the output end of the projection lens 10.

The sides of the lens housings 31, 32 are machined with "flats" 31a, 32a (FIGS. 1, 2a, 2b) that provide additional clearance so that the lens 10 is compatible with gates of different makes, models and age of projectors. Conventional lenses can not accommodate these varying makes and models and produce sufficient light levels.

Screws 38, such as socket head Torx screws, for example, are inserted through openings 38a in the polarizer housing 51 (FIG. 4c) and are threaded into openings in the chassis 11 in order to secure the chassis 11 and the polarizer/mirror section 13 and aperture section 14 together.

If the lens 10 is turned sideways, and an anamorphic lens 56 (FIG. 1) is attached, by way of threads 55 (FIGS. 1, 4c), for example, to the aperture housing 51, side by side format 3D films as produced in the 1950's may be projected.

The modulation transfer function (MTF), or optical transfer function (OTF), of an exemplary reduced-to-practice lens 10 is 200 line pairs which is above the film emulsion capability, and contrast, color and the depth of field are impressive. Using the wire grid polarizers 73a, 73b also produces superior extinction and transmission with the light levels to the human eye that are on the order of three times for digital 3D projection and two times current 3D analog images. The light to the human eye is above the SMPTE standard for flat two dimensional images, which is 16 foot lamberts. Reduced-to-practice lenses 10 exhibit 18 foot lamberts. The ultimate goal for 3D projection was to provide the same level of light to the eye as a standard 2D presentation. Reduced to practice lenses 10 have demonstrated this capability by a combination of the wire grid polarizers and proprietary optical element designs and proprietary multilayer coatings.

Setup and adjustment of the 3D optical projection lens 10 is relatively simple. With regard to mechanical considerations, all adjustments of the lens 10 are made from the front of the lens 10 and can be done with the lens 10 installed in the projector and the projector running. Convergence adjustments may be done by rotational movement of the convergence screw 43. Independent focus adjustment of the upper lens set 21 may be performed using the focus adjustment screw 33 to resolve any keystone issues. The aperture housing 51 is removable from the front of the lens 10 while it is installed in a projector. The aperture housing 51 has independent moveable top and bottom strips 67 for use in masking the image displayed on the screen. This eliminates the need to mask the image on projection port windows of the projector.

With regard to optical considerations, all lenses and spacers are installed in a stacked "poker chip" method and are held in position by a compression spring that creates an axial load on the assembly. There is no cements used in the optics section 12. The sealed independent assemblies are preferably tested and matched as sets.

With regard to polarization, the lens 10 may be used to project linear or circular polarized light. This is accomplished using the wire grid polarizers 73a, 73b in arrangements that are at 45/135 degrees or 0/90 degrees. Also, an optional hot mirror 74 may be used to reflect infrared light back toward the light source (i.e., projector), while allowing visible light to pass.

The features and advantages of the above-described lenses 10 resolves the issues mentioned in the Background section by utilizing wire grid polarizers 73a, 73b as opposed to film based polarizers. Based on the level of power delivered from the lamp house, an optional hot mirror 74 optimized for the IR spectrum can be placed into a position on the output side of the truncated lens sets 21. The hot mirror 74 has a single piece configuration that covers the entire area of both truncated lens sets 21. This ensures IR rejection from not only the optical axis, but also any stray reflections that could migrate into the lens sets 21. Reliable operation at light levels in excess of 7-9 k can be realized. Conventional technology is limited to 4 k.

Mechanical issues with regards to back focus and radial clearance for virtually all known projector types and models is resolved by providing the optics module 12 with a minimum dimension to the first optics element plane and the mechanical addition of flats on both sides of the upper and lower housings 31, 32. This provides maximum clearance on the sides of the projector gate.

The lenses 10 resolve convergence and keystone issues by utilizing a rotational convergence design with significant range for the right eye to be adjusted for keystone and backfocus. All adjustments are made from the front of the lens 10 while installed in a projector and accessible from the projectionist side of the projector while running. The rotational convergence design is also considerably less sensitive to projector vibration or movement.

A projector aperture plate is recommended and cut to the height of the film format (Ref: SMPTE 257). The lens 10 has two elements to deal with image spill. The wire grid polarizer holder 71a and the quarter wave/port plate holder 71b are designed with a center septum 71c that matches the SMFTE 257 standard for the film format, thus providing a septum 71c within the lens. On the output end of the lens 10 is an aperture housing 51 that contains an aperture mask with top and bottom moveable strips 67 that the projectionist sets to mask the top and bottom of the screen for any spill. The aperture housing 51 is removable from the front of the projector while running and when replaced into the lens 10 is precisely reoriented by detents in the aperture housing 51 and main chassis 11 of the lens 10. This eliminates the need for any hand masking and the lens can also be used in circumstances where no port window exists.

The lens 10 can be a linear polarized version or a circular polarized version. In the linear polarized version the wire grid polarizers 73a, 73b are placed into the polarizer holder 71a, and in the quarter wave plate holder 71b, glass ports are installed to seal the lens 10 from the output side. In the circular polarized version wire grid polarizers 73a, 73b with a 0/90 degree axis are installed in the polarizer holder 71a and quarter wave retarders are placed in the quarter wave plate holder 71b. The retarders rotate the image for individual eyes as is appropriate. The quarter wave retarder plates also provide a seal for the output side of the lens 10. The retarders are only used for the circular polarized version of the lens 10.

With regard to the optics and optics module 12, the lens 10 optical designs have 9-11 elements depending upon focal length. The lens sets 21 of the optics modules 12 are assembled in a unique, poker chip method and axially loaded utilizing retainers and compression spring. There are no known lenses with this number of elements that do not use an interior adjustable optical module within the optical train. The lenses comprising the lens sets 21 have a multi-layer antireflection coating. There is no cement used in the lens 10.

The lens 10 has other advantages including simple installation by any projectionist. Installation of the lens into a projector takes about 10 minutes. The lens 10 is highly reliable. The lens 10 fits all known commercial 35 mm cinema projectors. The lens 10 may be used to exhibit films on any size screen, and is not limited to 40 foot wide screens as are competing lenses. Reduced to practice lenses 10 can project images on screens in excess of 82 feet in width.

Thus, improved optical projection lenses having a split lens design for use in projecting three-dimensional images have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Projection lens apparatus comprising:
   a chassis;
   first and second sets of offset truncated optical elements disposed at an input end of the chassis;
   first and second polarizers disposed in respective light paths of the first and second sets of offset truncated optical elements; and
   an adjustable aperture disposed at an output end of the chassis.

2. The apparatus recited in claim 1 wherein the first and second polarizers comprise wire-grid polarizers disposed in respective light paths of the first and second sets of offset truncated optical elements.

3. The apparatus recited in claim 1 further comprising a hot mirror disposed between the first and second polarizers and the first and second sets of offset truncated optical elements.

4. The apparatus recited in claim 1 wherein the adjustable aperture comprises upper and lower adjustable masking strips adjustably attached to upper and lower edges thereof.

5. The apparatus recited in claim 4 wherein the upper and lower adjustable masking strips are adjustable up and down using pins as guides to allow a projectionist to mask an image for a particular throw of the image.

6. The apparatus recited in claim 1 further comprising focus adjustment apparatus for adjusting the focus of the first set of offset truncated optical elements relative to the second set of offset truncated optical elements.

7. The apparatus recited in claim 1 further comprising convergence adjustment apparatus for adjusting the convergence of the first and second sets of offset truncated optical elements.

8. The apparatus recited in claim 1 wherein the polarizers comprise wire-grid polarizers are separated by a septum.

9. The apparatus recited in claim 1 wherein the polarizers are circularly polarized and the apparatus further comprises quarter wave retarders for rotating images projected along the respective light paths of the first and second sets of offset truncated optical elements.

10. The apparatus recited in claim 1 wherein the polarizers comprise wire-grid polarizers that are linearly polarized and the apparatus further comprises glass ports to seal the apparatus at its output end.

* * * * *